(12) United States Patent
Focke et al.

(10) Patent No.: US 8,712,103 B2
(45) Date of Patent: Apr. 29, 2014

(54) METHOD AND DEVICE FOR DETERMINING PROCESSED IMAGE DATA ABOUT A SURROUND FIELD OF A VEHICLE

(75) Inventors: Thomas Focke, Ahrbergen (DE); Henning Von Zitzewitz, Hildesheim (DE); Thomas Engelberg, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 92 days.

(21) Appl. No.: 13/251,367

(22) Filed: Oct. 3, 2011

(65) Prior Publication Data

US 2012/0087546 A1    Apr. 12, 2012

(30) Foreign Application Priority Data

Oct. 6, 2010 (DE) .................... 10 2010 042 063

(51) Int. Cl.
*G06K 9/00* (2006.01)
*G01C 21/00* (2006.01)
(52) U.S. Cl.
USPC ............................. 382/104; 382/291; 701/523
(58) Field of Classification Search
CPC ................................. B60K 35/00; B60R 1/00
USPC ......... 382/100, 103–107, 155, 162, 168, 173, 382/181, 232, 254, 274, 276, 291, 305, 382/312; 348/148; 340/435, 461, 932.2; 701/523, 32.9
See application file for complete search history.

(56) References Cited

U.S. PATENT DOCUMENTS

| 7,088,262 | B2 * | 8/2006 | Schindler et al. ........... 340/932.2 |
| 7,103,460 | B1 * | 9/2006 | Breed ........................... 701/32.9 |
| 7,941,269 | B2 * | 5/2011 | Laumeyer et al. ............ 701/523 |
| 8,063,759 | B2 * | 11/2011 | Bos et al. ....................... 340/461 |
| 8,305,444 | B2 * | 11/2012 | Hada ............................. 348/148 |
| 2007/0159312 | A1 * | 7/2007 | Chen et al. .................... 340/435 |

FOREIGN PATENT DOCUMENTS

DE    10 2009 005 505    10/2009

\* cited by examiner

*Primary Examiner* — Seyed Azarian
(74) *Attorney, Agent, or Firm* — Kenyon & Kenyon LLP

(57) ABSTRACT

A method for determining processed image data about a surround field of a vehicle includes a step of combining a map information item with a position and an orientation of the vehicle and with an image of the surround field acquired by a surround-field monitoring device of the vehicle, in order to obtain a position-specific image of the surround field. In addition, the method includes a step of processing the position-specific image so as to include at least one symbol that is assigned to a classified object in the position-specific image, in order to determine the processed image data.

11 Claims, 3 Drawing Sheets

METHOD AND DEVICE FOR DETERMINING PROCESSED IMAGE DATA ABOUT A SURROUND FIELD OF A VEHICLE

BACKGROUND OF THE INVENTION

1. Field of the Invention

The present invention relates to a method and a device for determining processed image data about a surround field of a vehicle, as well as to a corresponding computer program product.

2. Description of Related Art

Published German patent application document DE 10 2009 005 505 A1 describes a method for generating an image of the surroundings of a motor vehicle with respect to a virtual camera position, from the images of at least one camera situated at the motor vehicle. The camera images are converted to the virtual camera position and corrected by including further data regarding the surround field of the motor vehicle.

Known systems for an aerial perspective view of a vehicle surround field are limited to elimination of distortion, combining individual images, and to depicting the aerial perspective view in a simple manner.

BRIEF SUMMARY OF THE INVENTION

The essence of the present invention is a synthetic, abstracted, intuitive visualization of the vehicle surroundings, in which the objects relevant to the driving task, such as obstacles relevant to a collision, curbs or road markings, as well as information such as no-parking zones, parking fees or distance grids, are represented in highlighted form in the vehicle display, preferably, in the display of a head unit. The approach according to the present invention allows additional information relevant to the driver to be additionally made visible, i.e., permits a new type of display. This further information is partly generated by image processing algorithms and partly obtained by linking to a digital map, as is used in navigation, and partly obtained via the Internet. In an advantageous manner, the approach according to the present invention may prevent the relative relationship to the real world from being lost by elimination of distortion and changing the perspective. In addition, ranges and distances may be displayed for the driver in an intuitively correct manner. This is rendered possible by metrologically assisting the driver in the form of information regarding distances to possible obstacles.

In addition, the driver may be given assistance in finding parking spaces by intuitively inserting no-parking zones in the aerial perspective view. The elimination of distortion from objects, which are detected by the cameras in an incomplete and, occasionally, highly misleading manner, results in images that do not correspond to human visual perception. The present invention may eliminate this shortcoming by making synthetic objects visible, which produces a display for the driver that is considerably more understandable.

The insertion of the additional information, i.e., the type of display, may increase the immediate benefit to the driver, by preventing accidents or violations of traffic rules. In addition, the type of display of the vehicle surround field according to the present invention increases the emotional value of the "Surround View System."

The present invention provides a method for determining processed image data about a surround field of a vehicle, including the following steps:
combining a map information item with a position and an orientation of the vehicle, as well as with an image of the surround field, the image representing an information item acquired by a surround-field monitoring device of the vehicle in order to obtain a position-specific image of the surround field; and
processing the position-specific image so as to include at least one symbol that is assigned to a classified object in the position-specific image, in order to determine the processed image data.

The surround field may represent the surroundings of the vehicle or a region in the surroundings of the vehicle. The combining may denote an operation, by which the information items are related to one another, linked to one another, or aligned with one another. The map information may include a digital map. In addition, the map information may include additional information items concerning the surround field, for example, regarding parking spaces. The map information may have been determined in advance and stored in a storage medium of the vehicle, or may be received via a communications interface of the vehicle. In addition, the map information may be made available by a piece of infrastructure in the surround field of the vehicle and transmitted to the vehicle. The position may denote a current location of the vehicle, and the orientation may denote a current orientation of the vehicle. The position and the orientation may be ascertained using a known position-finding method. The image may depict a region of the surround field monitored by one or more surround-field monitoring devices. Accordingly, the image may depict the current surround field of the vehicle. The position-specific image may combine, with one another, information items of the map information that are associated with the position of the vehicle, and information items of the image of the surround field. In the combining step or in the processing step, object classification may be carried out using known object classification methods. The classified object may be, for example, a vehicle, a person, a roadway marking or roadway boundary, a traffic sign or a parking space. The symbol may be selected according to the object classification and assigned to the classified object. The processing may constitute superimposing or mixing the information items of the position-specific image on or with the information items of the object. In this context, parts of the position-specific image may be replaced by the symbol or partially or completely covered by the symbol. The symbol may be a simplified representation of the object. For example, the symbol may depict a vehicle or a pedestrian. The symbol may have a lower information density than the object represented. The processed image data may be displayed using a display device. The processed image data may represent an aerial perspective view, i.e., may show the vehicle and, in particular, the surround field from above. For that purpose, a virtual camera position may be selected so that a top view of the vehicle and its surroundings is generated. However, other virtual reference points of the camera, as well as representational forms of the processed image data, are equally possible.

The method may include a step of adapting an orientation and/or a scaling of the symbol to the classified object in the processed image data. Symbols, which are used for representing the information in the image data, may strengthen an impression of the realism of the processed data via true-to-scale implementation and arrangement. In this manner, the driver may link the display more easily to the perceived reality.

In the processing step, the position-specific image may be processed so as to include a portrayal of distance, the portrayal of distance being formed in order to represent, in the processed image data, a distance between a classified object and the vehicle and/or distance lines in an open space navigable for the vehicle. The portrayal of distance may be implemented in the form of a grid as a distance grid. A representation using lines of equal distance from the vehicle, or a representation as text, is also possible. Making the distance information visible may allow a direct relationship between the processed image data and the surroundings of the vehicle to be produced for the driver.

In addition, in the processing step, the position-specific image may be processed, based on an anticipated path of motion of the vehicle and/or a detected trajectory of the classified object. The anticipated path of motion of the vehicle may be ascertained from current data of the vehicle, such as speed and steering angle or yaw rate.

In the same way, an anticipated point of contact or collision point with the object may be ascertained in advance, when additionally detected paths of motion of the object are taken into consideration in the image data. The path of motion may be made visible as a travel route envelope that encompasses the outer dimensions of the vehicle, which means that an intersection with the object that indicates a risk of collision may be detected or highlighted.

In addition, the map information may include information about a parking space, which may be combined, in the combining step, with the position of the vehicle. In the processing step, the position-specific image may be processed to include a symbol associated with the parking space. A parking space may denote traffic areas that are designated for the parking of vehicles. In the same manner, the parking space may include regions, which are not designated for parking, or in which parking is prohibited. The parking space may also include multi-story car parks and parking garages in the vicinity of the vehicle. Likewise, information about parking fees to be paid may be included in the information about the parking space. The information about a parking space may be supplied by a piece of infrastructure of a parking space.

Accordingly, the map information may be received from at least one service remote from the vehicle, the map information including an information item regarding a fee to be paid for the vehicle. In this context, data may be transmitted to the service remote from the vehicle, in order to pay the fee. Current and time-critical information may be transmitted to the driver via wireless transmission of information of service providers, using a service remote from the vehicle, such as the Internet or proprietary networks of local authority districts, road authorities or parking lot operators. If fees such as parking lot costs or a toll are charged for usage of parking areas or traffic areas, then the necessary payments may be made without cash, directly from the vehicle, via a network connection.

According to a further specific embodiment of the present invention, in the processing step, an object relevant to a current driving task of the vehicle is determined and highlighted in the processed image data. In this context, a degree of highlighting may be a function of a distance of the relevant object to the vehicle. Thus, for example, obstacles or prohibited areas located in the surround field of the vehicle may be detected and specially marked. The highlighting of the objects from the image data may be accomplished using signal colors or different brightness levels. Borders may also be highlighted in the processed image data.

In the processing step, the position-specific image may also be supplemented with a digital map from the map information. In this context, different driving situations permit various display options. For example, the detected surround field may be expanded by integrating additional information. To that end, a size of a displayed area may be increased at a higher driving speed. Areas that extend beyond the vehicle surround field detected by the surround-field monitoring device may be supplemented by map information. In addition, a majority of an expansion of the displayed surround field may be implemented in one direction. The current driving condition may be utilized for that. For example, the display area may be expanded in the direction of travel of the vehicle. In the same way, the map information may cover the image information completely or partially, although a transparent display is also possible.

The present invention further provides an apparatus for determining processed image data about a surround field of a vehicle, the apparatus having the following features:

a device for combining a map information item with a position and an orientation of the vehicle, as well as with an image of the surround field, the image representing an information item acquired by a surround-field monitoring device of the vehicle in order to obtain a position-specific image of the surround field; and a device for processing the position-specific image so as to include at least one symbol that is assigned to a classified object in the position-specific image, in order to determine the processed image data.

The apparatus may be an information system, in particular, a navigation system, or a part thereof. In the case at hand, the apparatus may be understood as an electric device that processes sensor signals and outputs control signals as a function thereof. The apparatus may have an interface that may take the form of hardware or software. In a hardware embodiment, the interfaces may, for example, be part of a so-called system ASIC that contains various functions of the method. However, it is also possible for the interfaces to be separate, integrated circuits or to be at least partially made up of discrete components. In a software embodiment, the interfaces may be software modules that are present on a microcontroller in addition to other software modules, for example.

Also advantageous is a computer program product having program code, which may be stored on a machine-readable medium such as a semiconductor memory, a hard-disk memory or an optical memory and is used to implement the method according to one of the specific embodiments described above, when the program is executed in a device corresponding to a computer.

DETAILED DESCRIPTION OF THE INVENTION

Figure 1:
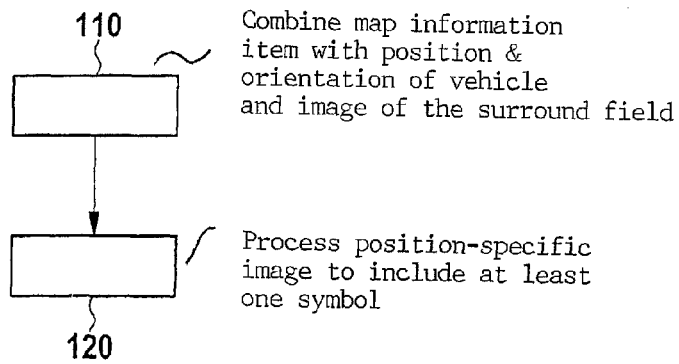
FIG. 1 shows a flow chart of a method according to an exemplary embodiment of the present invention.

In the subsequent description of exemplary embodiments of the present invention, the same or similar reference numerals are used for the elements that are shown in the various figures and function similarly, while a repeated description of these elements is omitted.

FIG. 1 shows a block diagram of a method for determining processed image data about a surround field of a vehicle, according to an exemplary embodiment of the present invention. In a step 110, a map information item is combined with a position of the vehicle, an orientation of the vehicle and an image of the surround field. The combining produces a position-specific image of the surround field. In a step 120, the position-specific image is processed to include at least one symbol, in order to obtain the processed image data. In this context, the symbol is assigned to a classified object that is encompassed by the position-specific image.

The map information, information about the position and the image of the surround field may be made available to the method via suitable interfaces or determined using preceding method steps. For example, the image may be provided by a camera system and a corresponding image processor. The position of the vehicle and the orientation or alignment of the vehicle may be supplied by a satellite positioning system or an optical position-determining system. Using combining step 110, the map information item is brought into relation with the image of the surround field and with the position and orientation of the vehicle. This produces the position-specific image of the vehicle surround field, which is processed in step 120. In this context, the object may initially be detected and classified, using one or more method steps. Subsequently, each object or selected, detected or classified objects in the position-specific image may be assigned a corresponding symbol from a supplied database. The processed image data may be output and displayed by a display device.

Figure 2:
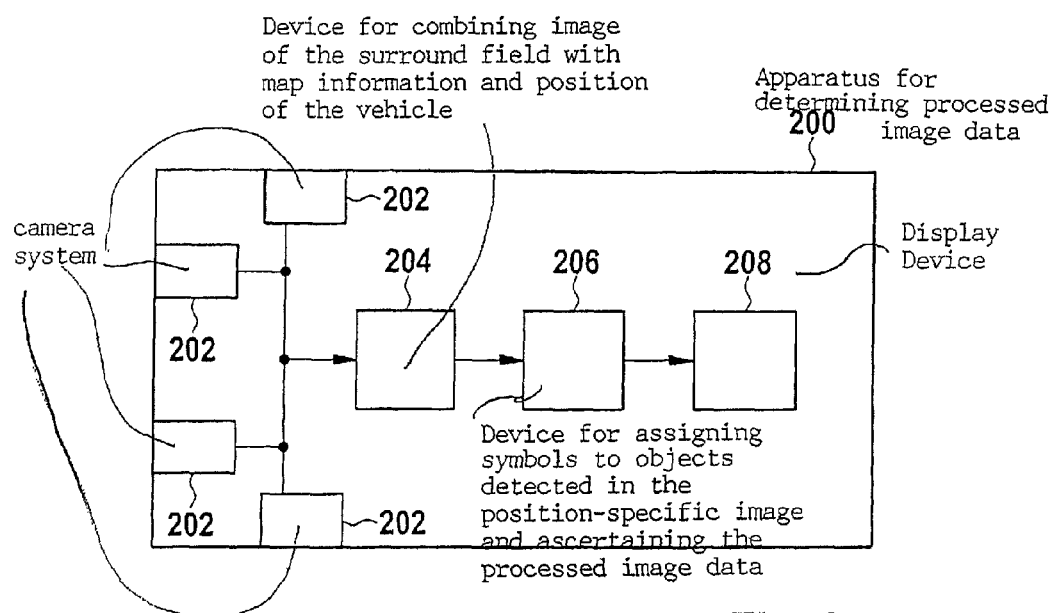
FIG. 2 shows a schematic representation of a vehicle having an apparatus according to an exemplary embodiment of the present invention.

FIG. 2 shows a block diagram of an apparatus for determining processed image data about a surround field of a vehicle 200, according to an exemplary embodiment of the present invention. The apparatus has a camera system 202, a device 204 for combining, a device 206 for processing and a display device 208. The method for determining processed data about the surround field of the vehicle may be implemented on the apparatus.

Camera system 202 is configured to pick up a plurality of images of a surround field of vehicle 200. An image of the surround field may be assembled from the images. The image may contain a shift of viewing angle, so that the surround field may be represented from an aerial perspective. Objects in the surround field may be detected and classified. Device 204 is configured to combine the image of the surround field with map information and a position of vehicle 200. For that purpose, device 204 may have corresponding interfaces. A position-specific image ascertained in device 204 from the image, the map information and the position is processed further by device 206. Device 206 is configured to assign symbols to the objects detected in the position-specific image and to ascertain the processed image data from the symbols and the position-specific image. A database having the corresponding symbols may be stored in device 206. The processed image data are output by device 206 to display device 208. Display device 208 is configured to display the processed image data for an occupant of the vehicle, e.g., on a video screen.

Figure 3:
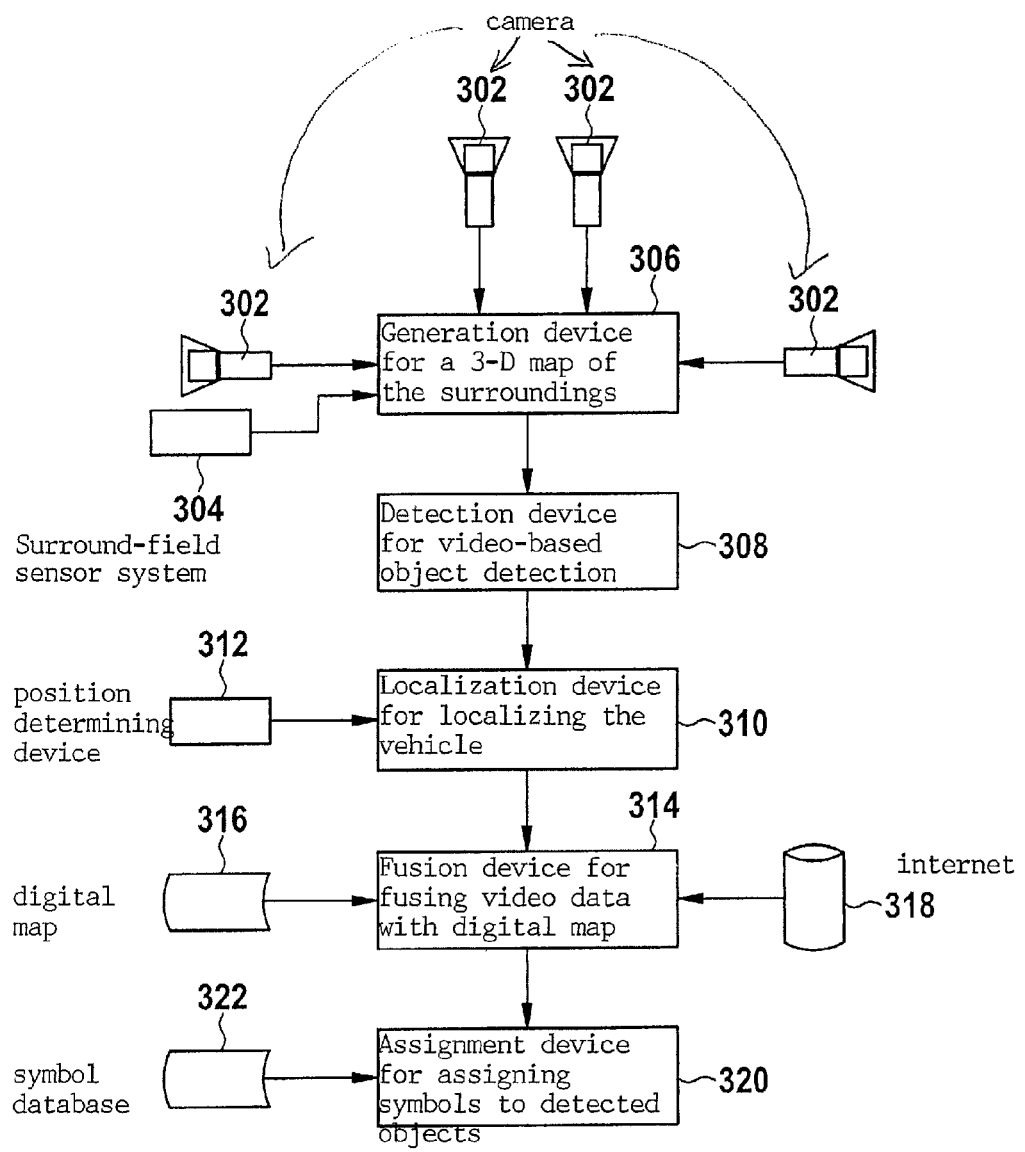
FIG. 3 shows a block diagram of an exemplary embodiment of a top-view system according to an exemplary embodiment of the present invention.

FIG. 3 shows a block diagram of an apparatus for determining processed image data about a surround field of a vehicle, according to an exemplary embodiment of the present invention. According to this exemplary embodiment, the apparatus is constructed as a top-view system.

The apparatus has a surround-field monitoring system, which includes a plurality of cameras 302 and, additionally or alternatively, one or more radar, ultrasonic or lidar devices. In addition, the apparatus includes a generation device 306, a detection device 308, a localization device 310 having a position determination device 312, a fusion device 314 having a digital map 316 and access to the Internet 318, as well as an assignment device 320 having a symbol database 322.

Generation device 306 is configured to control the picking-up of video camera images of camera 302 and to generate a three-dimensional map of the surroundings and a top-view display. Based on the information produced by generation device 306, detection device 308 is configured to carry out a video-based object detection and classification. In addition, a video-based landmark detection is carried out. A localization device 310 has an interface to position determination device 312, which supplies an information item about the position of the vehicle to position determination device 312, based on satellite positioning via GPS or Galileo. Position determination device 312 is configured to carry out an ego-localization, based on the position of the vehicle and, additionally or alternatively, based on landmarks. Fusion device 314 has interfaces to digital map 316 and the Internet 318. Fusion device 314 is configured to fuse the video data with digital map 316, as well as to implement a fusion with data from the Internet 318. Assignment device 320 is configured to assign symbols from symbol database 322 to detected objects. In addition, assignment device 320 is configured to implement an image composition from the top-view image, Internet images and synthetic image elements. The image composition may be displayed in a display.

In the following, different exemplary embodiments of a vehicle surround-field visualization on the basis of a multi-camera system are described in light of FIG. 3.

A multi-camera system is the basis of the system, a plurality of cameras 302 being situated around the vehicle in such a manner, that gapless monitoring of the vehicle surround field is provided. A so-called "top-view display" (shown in FIG. 4) is generated from the data of these cameras 302 and displayed on a display. The calculation of the top-view display, as well as all of the other algorithms for generating the additional information, take place preferably, but not necessarily, directly on the head unit.

Now, in the following, several implementations are described that signify an increase in the usefulness. According to FIG. 3, the system of the present invention is made up of a plurality of modules, which include, in particular, the following functions. Multi-camera system 302 is connected to a video input module 306. In this video input module 306, the images of individual video cameras 302 are recorded. Using methods for acquiring depth information in a video image, such as structure from motion, a three-dimensional map of the surroundings of the monitored vehicle surround field is calculated. As an option, this may also be accomplished using available surround-field sensor systems 304, such as ultrasonic parking sensors and radar and lidar sensors. On the basis of the 3-D map of the surroundings, the video image data of individual cameras 302 are converted to a top-view perspective and combined with one another. Starting out from the information acquired in this manner, in an object detection module 308, objects and landmarks that are present are detected and, when possible, classified, using known methods. The GPS/Galileo-based localization of the reference vehicle, which is already present in the head unit, is expanded by known methods of video-based localization employing known landmarks, such as SLAM. This takes place in a localization module 310. After localization has taken place, the data from the described video processing and from digital map 316 are merged in a fusion module 314. In a synthesis module 320, standard symbols are assigned to the classified objects and landmarks. In this context, the symbols come from a database 322, the database being subdivided into customary symbols. The central function of this module is to construct the image to be displayed from the synthetic elements and the top-view image generated beforehand.

According to a specific embodiment, information about no-parking zones is made visible in the top-view image in a correct location, i.e., in a manner that is intuitively perceptible to the driver. Information regarding the size and position of the no-parking zones may be taken from the digital map, which is easily possible in the case of an implementation in the head unit. An important prerequisite for this is localization of the reference vehicle by GPS/Galileo and/or video-based landmark localization with reference to the digital map. In addition, no-parking areas may be detected by image processing methods and correspondingly displayed. According to an exemplary embodiment, no-parking zones, which are stored in the map, and no-parking zones recognized in the video image via traffic-sign detection or detection of jagged no-parking areas, may be mutually validated.

According to an exemplary embodiment, using the interface to digital map 316, optionally expanded by an Internet connection 318 via a mobile radio communication link or DSRC toll system, information about parking fees may be made visible in the top-view image, and corresponding booking events may also be executed via the radio communication links.

According to an exemplary embodiment, using image processing methods such as "Structure from Motion" or gradient and curb detection methods, in combination with plane estimation methods, curbs and parking space markings may be detected in the camera images and drawn into the top-view image so as to be especially highlighted. In this context, the type of highlighting may vary with the distance to the curb. The relevance is encoded as a function of the manner of display, as follows. Curbs situated close to the vehicle are highlighted more perceptibly than curbs that are further away. The highlighting may be implemented, such that the color, such as a signal color, or the brightness of the curb that should be highlighted, is correspondingly intensified. The same applies to detected obstacles, such as parking garage columns or flower pots, which are highlighted as detected objects in the top-view image.

According to an exemplary embodiment, objects, which are detected in the multi-camera images with the aid of corresponding methods, are measured in the video image and classified. On the basis of the object classification, a classified object is indicated in the top-view image by a standard symbol, which is then drawn, true to scale, into the top-view image, and in the case of color camera systems, in the correct, detected color. Obvious standard symbols for objects to be encountered in road traffic include, for example, the standard automobile symbol or the standard pedestrian symbol, which are available in a symbol database 322.

Figure 4:
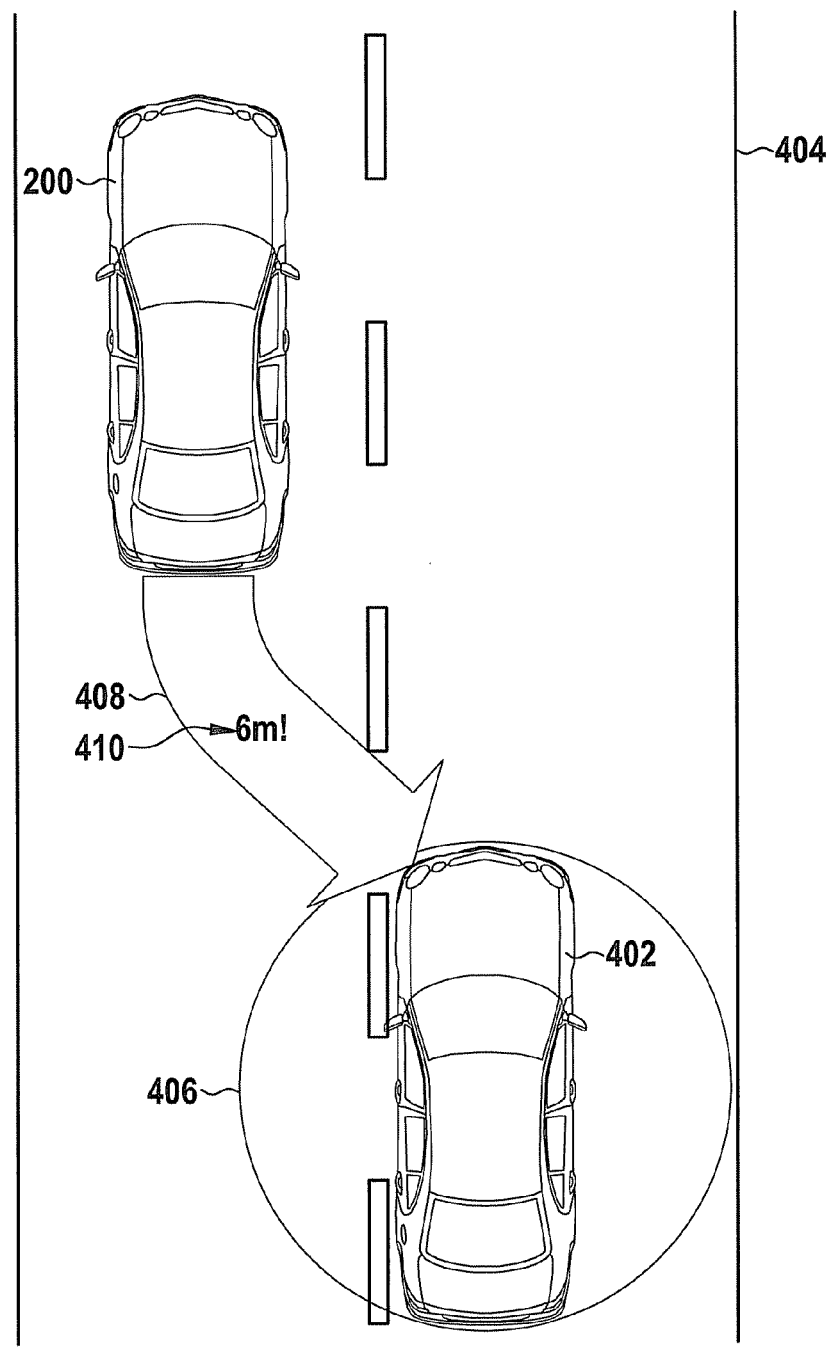
FIG. 4 shows a possible display form of a vehicle surround field visualization on the basis of a multi-camera system, according to an exemplary embodiment of the present invention.

The elimination of distortion and the perspective view may possibly cause the driver to misinterpret the distances and ranges actually present. According to an exemplary embodiment, this problem may be solved by inserting a distance grid into the top-view image, limited to the region of detected open spaces around the ego vehicle. Consequently, the driver maintains an optimum relationship with distances actually existing within the areas navigable by him or her. Distances between the reference vehicle and collision-relevant obstacles in the direction of travel may be additionally drawn into the top-view image. In this context, the relevant object is selected, using the prediction of the reference travel route envelope in combination with the detected trajectory of other vehicles situated in the detecting range. In this case, the distance to a predicted collision point is calculated and displayed, as is shown in FIG. 4. Further selection criteria may include the nearest obstacle, or else manual selection via the touch screen of the driver information system. In addition to the above-mentioned distance information, the predicted, reference travel route envelope is inserted into the top-view image, e.g., in semitransparent form. In this context, the travel route envelope is predicted on the basis of the measured steering angle and the yaw rate of the vehicle.

According to an exemplary embodiment, a mixed display of the top-view image and digital map 316 may be generated, using the interface to digital map 316. In this context, the transition between the two kinds of display may be fluid, that is, regulated via a speed-dependent zoom level. However, the mixed display may also be made up of a real top-view camera image and a semitransparent map representation in the correct scale.

According to an exemplary embodiment, an aerial image or a satellite image, which may be available in a database, for example, or is transmitted into the vehicle via Internet connection, may be used instead of the map image. In this case, as well, a mixed display may be implemented by semitransparently superimposing the satellite image over the top-view camera display. The database is filled in such a manner, that potential service providers, such as shopping centers, fairs and restaurants, provide aerial images or orientation plans or floor plans of their respective parking garages or parking spaces via Internet or storage medium. To efficiently utilize the computing resources in the head unit, it is proposed that the aerial images or floor plans present in the database be preprocessed at an earlier time than the actual display. This means that using image processing methods, the images are already "marked" with regard to no-parking areas and objects to be detected, either when they are stored in the database, or as soon as the vehicle approaches the "target zone."

According to an exemplary embodiment, the top-view display may be changed as a function of the situation, such that the virtual camera is positioned to give the driver the optimum view of the scene relevant to him or her. This may be arranged, such that, e.g., upon engagement of the reverse gear, the virtual camera position is selected to be more or less above the engine hood, so that in the display, the driver sees his own vehicle and as much of the surround field as possible in the direction of travel. Both the position and the direction of view, viewing angle and the zoom level of the virtual camera may also vary with the steering angle and the current ego speed.

As an alternative to the top-view display of the multi-camera images, a panorama view of the vehicle surround field may be implemented in the display. In this context, the images of the individual cameras are not perspectively changed, but merely preprocessed so that they may be combined to form a high-quality panorama image. In so doing, a complete panorama image is not displayed, but always just a part of the panorama image that corresponds to a particular direction of view. The decision about which direction of view is displayed at the very moment is made either by the driver by scrolling on the touch screen, or via iDrive or keyboard input, e.g., at the head unit. Alternatively, the direction of view of the virtual camera may be automatically selected in light of the detected driving situation. Examples of this may include a rearward direction of view for driving backwards or engaging reverse gear, and a lateral or diagonally rearward direction of view for driving by a parking space. The system may also allow the viewing angle range to be scaled as a function of the specific driving situation. In this context, it is important to give the driver information, in a suitable form, as to the direction in which his multi-camera system is presently pointed. This may be accomplished, for example, using a compass rose in the form of a vehicle symbol, in which the current direction of view and the current viewing angle are specially colored.

According to an exemplary embodiment, a display system for creating a 3-dimensional impression may be used for displaying the top-view image and the superimposed synthetic elements. For example, autostereoscopic systems may be used in which 3-D glasses are not required.

FIG. 4 shows a form of display of processed image data, according to an exemplary embodiment of the present invention. A relevant obstacle in a current travel route envelope is shown. Two vehicles 200, 402 are displayed on a street 404. A round region 406 around vehicle 402 is displayed in a brightened manner. A path of travel 408 in the form of a travel route envelope is displayed behind vehicle 200. Inside travel route envelope 408, a distance information item 410, which is 6 m in this exemplary embodiment, is displayed between the two vehicles 200 and 402. In the exemplary embodiment, vehicle 200, which constitutes the ego vehicle, is in a driving situation of parking. To that end, the driver has engaged the reverse gear, and in vehicle 200, the display is adapted to the "parking" situation in response to the reverse travel signal. In addition, based on a current direction of travel, a current yaw rate and a current steering wheel angle, a path of travel is ascertained and displayed as travel route envelope 408. If a relevant obstacle, in this case, vehicle 402, is situated in current, ascertained travel route envelope 408, then it is specially highlighted in the display by brightened region 406. In addition, distance information item 410, which represents the distance between the two vehicles 200 and 402, is inserted into the display. Other obstacles, such as curbs or boundary elements, are likewise detected and may be further highlighted. Distance information item 410 may also be displayed in a different manner. To that end, e.g., lines may be inserted around vehicle 200 at predetermined spacings. These lines may be made visible exclusively on navigable surfaces. As an alternative to the lines, the distance display may also be implemented using a grid projected onto the roadway. In this display, vehicles 200 and 402 are replaced by symbolic vehicles. In this manner, the side of vehicle 402 facing away from vehicle 200 may also be displayed. The vehicle 200 taking the form of the ego vehicle is denoted by a symbolic steering-wheel display.

The exemplary embodiments described and shown in the figures have been selected only as examples. Different exemplary embodiments are able to be fully combined with one another, or combined with one another with regard to individual features. An exemplary embodiment may also be supplemented by features of another exemplary embodiment. In addition, method steps of the present invention may be executed repeatedly, as well as in an order other than that described. If an exemplary embodiment includes an "and/or" conjunction between a first feature and a second feature, this may be read to mean that according to one specific embodiment, the exemplary embodiment has both the first feature and the second feature, and that according to a further specific embodiment, the exemplary embodiment has either only the first feature or only the second feature.

What is claimed is:

1. A method for determining processed image data of a surround field of a host vehicle, comprising:
    combining a map information item with a position of the vehicle, an orientation of the vehicle, and an image of the surround field acquired by a surround-field monitoring device of the vehicle, in order to obtain a position-specific image of the surround field; and
    processing the position-specific image so as to (i) include at least one symbol which is assigned to a classified object external to the host vehicle in the position-specific image, wherein the classified object is one of a physical obstacle or a road sign, and (ii) adapt an orientation and scaling of the symbol assigned to the classified object in the position-specific image to correspond to a true-to-scale image, in order to determine the processed image data for display.

2. The method as recited in claim 1, wherein in the processing step, the position-specific image is processed so as to include a numerical portrayal of distance, wherein the portrayal is formed in order to represent in the processed image data at least one of (i) a distance between a classified object and the host vehicle and (ii) distance lines in an open space navigable for the host vehicle.

3. The method as recited in claim 1, wherein in the processing step, the position-specific image is processed based on an anticipated path of motion of the host vehicle.

4. The method as recited in claim 1, wherein in the processing step, a classified object relevant to a current driving task of the vehicle is determined and highlighted in the processed image data, and wherein a degree of the highlighting is a function of a distance of the relevant classified object to the host vehicle.

5. The method as recited in claim 1, wherein:
    the map information item includes information about a parking space, the map information item being combined in the combining step with the position and the orientation of the vehicle; and
    in the processing step, the position-specific image is processed so as to include a symbol associated with the parking space.

6. The method as recited in claim 5, wherein:
    the map information item is received by at least one service remote from the vehicle;
    the map information item includes information about a fee to be paid for the vehicle; and
    data are transmitted to the service remote from the vehicle, in order to pay the fee.

7. The method as recited in claim 5, wherein in the processing step, the position-specific image is supplemented with a digital map from the map information item.

8. The method as recited in claim 1, wherein a viewing perspective of the processed image data for display is varied as a function of at least one of a steering angle and a driving speed of the host vehicle.

9. The method as recited in claim 1, wherein the processing step further includes adjusting the processed image data to vary a size of a displayed area of the surround field as a function of a driving speed of the host vehicle.

10. An information system for determining processed image data about a surround field of a host vehicle, comprising:
    a device for combining a map information item with a position of the vehicle, an orientation of the vehicle, and an image of the surround field acquired by a surround-field monitoring device of the vehicle, in order to obtain a position-specific image of the surround field; and
    a device for processing the position-specific image so as to (i) include at least one symbol which is assigned to a classified object external to the host vehicle in the position-specific image, wherein the classified object is one of a physical obstacle or a road sign, and (ii) adapt an orientation and scaling of the symbol assigned to the classified object in the position-specific image to correspond to a true-to-scale image, in order to determine the processed image data for display.

11. A non-transitory computer-readable data storage medium storing a computer program having program codes which, when executed on a computer, perform a method for determining processed image data of a surround field of a host vehicle, the method comprising:
- combining a map information item with a position of the vehicle, an orientation of the vehicle, and an image of the surround field acquired by a surround-field monitoring device of the vehicle, in order to obtain a position-specific image of the surround field; and
- processing the position-specific image so as to (i) include at least one symbol which is assigned to a classified object external to the host vehicle in the position-specific image, wherein the classified object is one of a physical obstacle or a road sign, and (ii) adapt an orientation and scaling of the symbol assigned to the classified object in the position-specific image to correspond to a true-to-scale image, in order to determine the processed image data for display.

* * * * *